G. W. OTTERSON.
APPARATUS FOR CLEANING OUT CITY CATCH BASINS.
APPLICATION FILED MAY 2, 1916.
Reissued Dec. 19, 1916. 14,234.
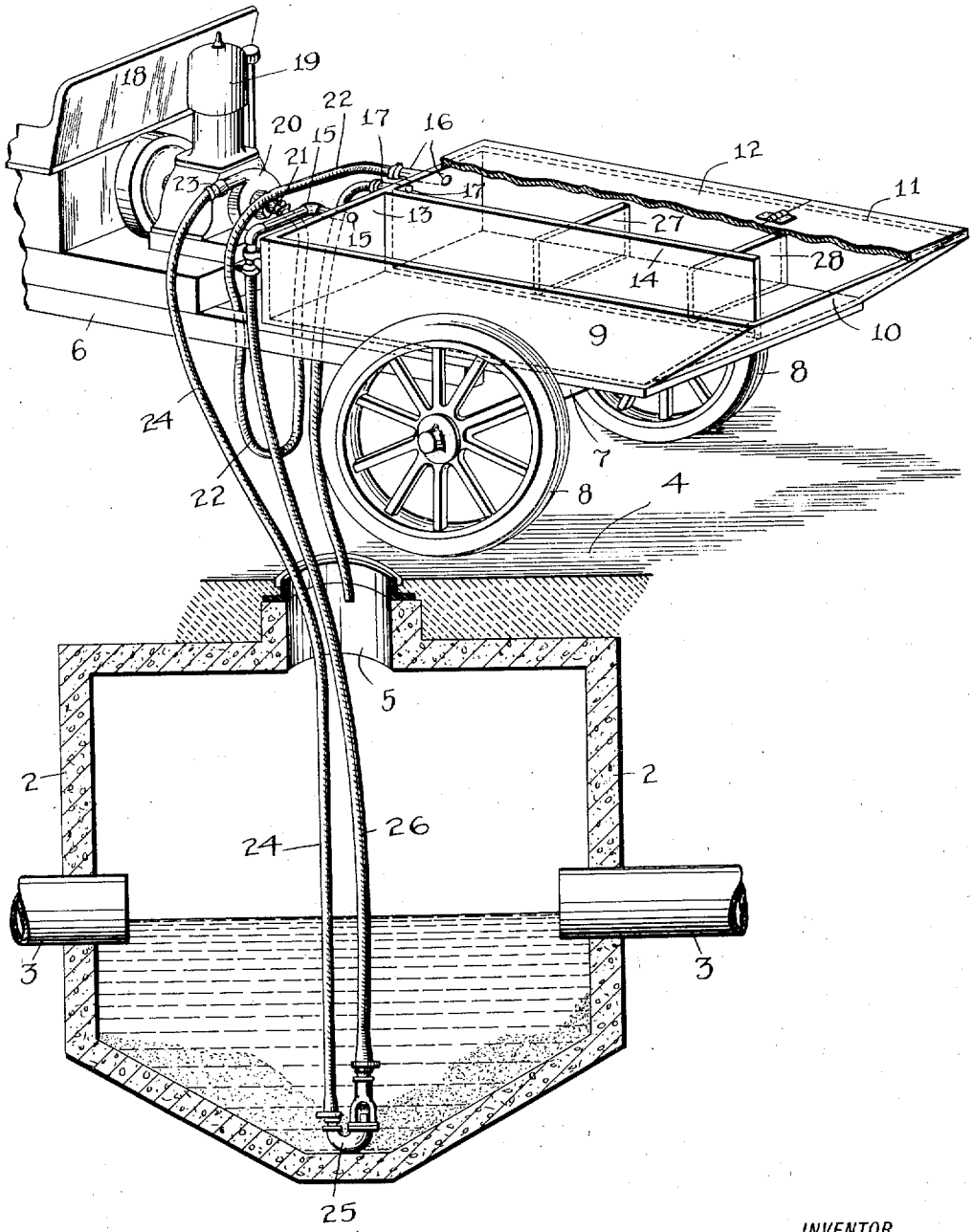
WITNESSES:
Geo. A. Simon
Elsie Greenberger
INVENTOR
George W. Otterson
BY
G. P. Sandenburg
ATTORNEY

UNITED STATES PATENT OFFICE.

GEORGE W. OTTERSON, OF SEATTLE, WASHINGTON, ASSIGNOR TO OTTERSON AUTO EDUCTOR COMPANY, OF SEATTLE, WASHINGTON, A CORPORATION OF WASHINGTON.

APPARATUS FOR CLEANING OUT CITY CATCH-BASINS.

14,234. Specification of Reissued Letters Patent. Reissued Dec. 19, 1916.

Original No. 1,166,713, dated January 4, 1916, Serial No. 28,788, filed May 17, 1915. Application for reissue filed May 2, 1916. Serial No. 94,973.

*To all whom it may concern:*

Be it known that I, GEORGE W. OTTERSON, citizen of the United States, residing at Seattle, in the county of King and State of Washington, have invented a certain new and useful Improvement in Apparatus for Cleaning Out City Catch-Basins, of which the following is a specification.

My invention relates to apparatus for removing sediment or sand from catch-basins or sewers, and the object of my invention is to provide a vehicle that is provided with a tank containing water and with a force pump, together with a hydraulic elevator comprising an ejector and suitable connecting hose which may be moved from one catch-basin to another and its several devices be operated to clean and remove the sediment from successive ones of such catch-basins.

The apparatus includes a portable settling bed, which receives the water and accumulations ejected from the catch-basins by the elevator, means being provided for conducting the water from the settling bed to the pump to supply the ejector jet, and for returning into the sewer water in excess of that needed for priming the pump at the next catch-basin, before the apparatus leaves the catch-basin last cleaned.

In the accompanying drawings I have represented an embodiment of the invention, and referring to such drawing, 2 indicates a vertical mid-section of the inclosing walls of a catch-basin of a sewer, and 3, 3 indicate sections of a sewer-pipe disposed to lead into and out from said catch-basin at corresponding points through opposite side walls thereof. Extending from the interior of said catch-basin through its top wall to the surface 4 of a street is a man-hole 5 which is adapted to be covered by an iron plate (not shown) of well known form. Upon the rear end portion of a vehicle 6, and over its rear axle 7 and wheels 8, is mounted a tank 9 of rectangular form except that its rear end wall 10 extends obliquely upward and rearwardly from its bottom wall to facilitate the operation of dumping its contents. The rear end portion of the top of said tank 9 is covered by a hinged cover 11, only a fragment of which is shown, which hinged cover 11 is hinged to a fixed cover 12 of which, also, only a fragment is shown, said cover 12 tightly covering the larger portion of the top of said tank 9; thus in the operation of dumping the contents of the tank 9 the cover 11 may be forced to swing upwardly by the outflowing contents and be closed by its own gravity when said tank 9 is replaced in its normal horizontal position.

Extending rearwardly from the middle of the front end wall 13 to the middle of the bottom edge of the rear end wall 10 of the tank 9 is a vertical deflecting partition 14 whereby water may flow from one side of said partition 14 to the other side thereof only through the space between the rear end of said partition 14 and the obliquely disposed end wall 10. Disposed to extend through the front wall 13, near the top edge thereof, into the space on one side of the partition 14, is an inlet pipe 15 while an outlet pipe 16 extends through said front end wall 13 at a corresponding position on the other side of said partition 14, as shown, and near the pipe 16, on the same side of the partition 14, is an overflow outlet pipe 17.

On the floor of the vehicle 6 forward from the end of the tank 9 and back of a driver's seat 18 is secured an engine 19 with which is operatively associated a force pump 20. Connected with the suction inlet nipple 21 of said pump 20 is a hose 22 which extends to and connects with the outlet pipe 16 of the tank 9, while the delivery outlet nipple 23 of said pump 20 is connected with a hose 24 which extends downwardly to the bottom of the catch-basin where it is connected with the jet nozzle of a hydraulic ejector 25 to whose delivery end is connected a hose 26 which extends upwardly through and out of the man-hole 5 to connect with the inlet pipe 15 of the tank 9. This ejector is of known type having a self-feeding intake through which the material from the catch basin is drawn in by the action of the jet and thereby carried upward through the line 26 to the settling bed tank.

With the hose 22, 24 and 26 thus connected and with the tank 9 containing water, then if the force pump 20 be operated by the engine 19 water will be sucked from the tank through pipe 16 on one side of the partition 14, and such water passing through the pump 20 will be forced through the downwardly extended hose 24 through the hydraulic ejector 25, thence upwardly through the hose 26 to and through the inlet pipe 15 into the other side of said partition 14 and such water ascending through the pipe 26 will, in a well known manner, carry with it sediment drawn into the elevator 25, by which sediment said elevator 25 is surrounded as it lies on the bottom wall of the catch-basin; and such water with its required sediment passing through said pipe 15 into the space on one side of the partition 14 will then flow rearwardly in such space and around the end of the partition 14, into and forwardly through the space on the other side of said partition 14 to be again sucked out of the tank 9 through the outlet pipe 16 by the pump 20 again to make a circuit through the hose 24, elevator 25 and hose 26, such flow continuing during the operation of the pump 20.

As the water charged with sediment flows slowly from the inlet pipe 15 rearwardly to pass around the rear end of the partition 14 to the other side thereof much of such sediment will fall to the bottom of the tank 9 there to remain until dumped; and in the passage of such water from the rear end of the tank 9 to the outlet pipe 16 nearly all of the remainder of such sediment will find its way to the bottom of the tank 9, there likewise to remain until dumped, so that although water entering the tank 9 through the pipe 16 may be highly charged with sediment, the same water as it is sucked out of the tank 9 on the other side of the partition 14 through the pipe 16 will be nearly clear water having parted with its sediment in its passage rearwardly and forwardly around the rear end of the partition 14. Thus, beginning with a tank full of clear water for use in operating the hydraulic elevator 25 such water may be actuated by the pump 20 continuously to circulate through the hydraulic elevator 25 and the tank 9 to carry sediment from the bottom of the catch-basin into the tank 9 there to settle to the bottom of the tank 9 in the manner described.

In the drawing I have shown two baffle-plates 27 and 28 that are spaced from each other and disposed to extend across the outflowing side of the partition 14.

I have shown a piece of hose 29 connected with the overflow pipe 17 to extend into the man-hole 5, of the catch-basin, such overflow outlet serving to permit the escape of any excess of water from the tank 9, which excess of water may be due to the picking up by the elevator 25 of additional sewer water contained in the catch-basin.

Obviously, after the tank 9 has received its load of sediment which has accumulated by operating on a number of different catch-basins, the pieces of hose 24, 26 and 29 may be raised and disposed on the vehicle 6 and then such vehicle 6 may move to a desired point to dump its contents in an obvious manner.

Having described and illustrated one form of apparatus for removing sediment from the catch-basin of a sewer, in accordance with my process, what I claim is:

1. An apparatus for cleaning out and removing the contents of city catch-basins, comprising a vehicle adapted to go about the streets and provided with tight communicating compartments for deposit of solids and separation of water respectively, the same constituting a settling bed and means for carrying a quantity of priming liquid, a hydraulic ejector elevator mounted on the vehicle and equipped with flexible pressure and discharge lines whereby it may be lowered and raised into and from the catch-basins, a power-driven force pump on the vehicle having its inlet connected with the water compartment and its outlet delivering into the pressure line to create the ejector jet of the ejector, the discharge line thereof leading upward to conduct the stream of water and solids to the solids compartment, and means for returning water from the water compartment into the catch-basin at the conclusion of the operation.

2. An apparatus for cleaning out and removing the contents of city catch-basins, comprising a vehicle adapted to go about the streets and provided with a tight tank body constituting a settling bed of large capacity and means for carrying a quantity of liquid for priming the pump hereinafter mentioned, a hydraulic ejector elevator provided with pressure and discharge lines and mounted upon the vehicle so that it may be lowered into and raised from the catch-basins, and a power-driven force pump on the vehicle having its inlet supplied from the settling bed and its delivery side connected with the pressure line to force water downward through the same to create the ejector jet of the ejector, the discharge line of the elevator leading upward to deliver the stream of water and solids into the settling bed from which the pump derives its supply, the settling bed having a return for running back into each basin the water in excess of that required for priming the pump at the next operation.

3. Means for cleaning out city catch basins comprising the combination of a force pump and means for driving the same, a hydraulic ejector elevator and means whereby the same may be lowered into the catch basins, said elevator having suitable pressure and discharge lines, the former connecting the ejector jet nozzle with the delivery side of the pump, a portable settling bed to receive the material from the discharge line of the elevator, means for conducting the water from the settling bed to supply the pump, means for returning excess water to the sewer, and vehicular means for transporting the aforesaid apparatus.

4. Apparatus for cleaning out city catch-basins comprising a vehicle provided with a force pump and means for driving the same, and with a hydraulic ejector elevator adapted to be lowered into the catch-basins, said elevator having suitable pressure and discharge lines, the former connecting the ejector jet nozzle with the delivery side of the pump, together with a portable settling bed to receive the material from the discharge line of the elevator, means for conducting water from the settling bed to supply the pump, and an additional line for returning excess water into the sewer.

5. An apparatus for cleaning out city catch-basins comprising, in combination, a vehicle, a settling tank thereon adapted to carry a supply of water to prime the pump hereinafter mentioned, the said settling tank having an inlet region, a water outlet remote in point of flow from the inlet region and baffles in its interior interposed in the path of flow between the inlet and outlet, a force pump and means for driving the same carried by the vehicle, the suction of said pump being connected with the water outlet from the settling tank, and a hydraulic ejector elevator also transported by the vehicle to be lowered into the catch-basins, the said ejector having a suitable pipe connecting the delivery side of the pump with the ejector nozzle and another pipe for conducting the material elevated by the ejector jet to the inlet region of the settling tank, and means for returning liquid from the settling tank into the sewer, in excess of that retained for priming the pump.

6. An apparatus for cleaning out city catch-basins, comprising a vehicle, a settling bed tank body thereon having means dividing its interior longitudinally into spaces communicating toward their rear ends, a hydraulic ejector elevator adapted to be lowered into the catch-basins and being provided with a suitable pressure line leading to its nozzle and a discharge line leading from its intake to discharge the material elevated by the jet into one of said spaces in the tank toward its forward portion, a pump and means for driving the same for forcing water through the pressure line and nozzle to create the ejector jet, a line for conducting liquid from the forward portion of the other space of the tank to the suction of the pump, and means for returning liquid from the same space to the catch-basin at the conclusion of the operation.

7. In apparatus of the class described, a portable settling tank consisting of a body of rectangular form having a slanting rear wall, a rectangular partition extending from the front wall of the body to the junction of the bottom and rear walls to leave a triangular space, baffles vertically disposed between the partition and one side wall and being of less height than the partition, an inlet tube on the front wall on the baffle provided side of the partition and an outlet tube on the opposite side of the front wall.

GEORGE W. OTTERSON.